D. R. GROVES.
CORN-DRILLS.
No. 180,870. Patented Aug. 8, 1876.
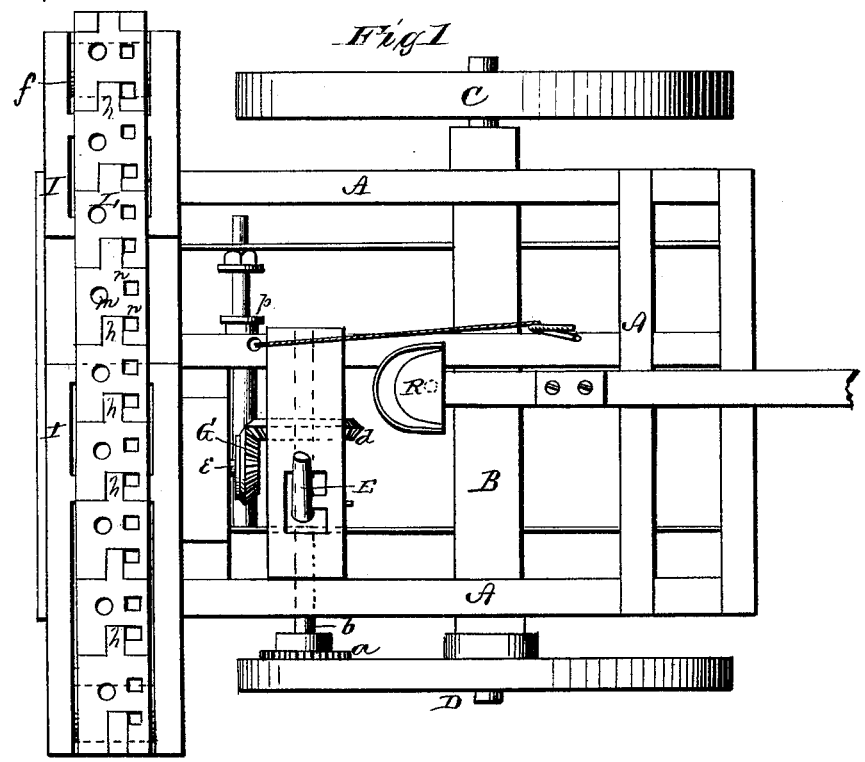
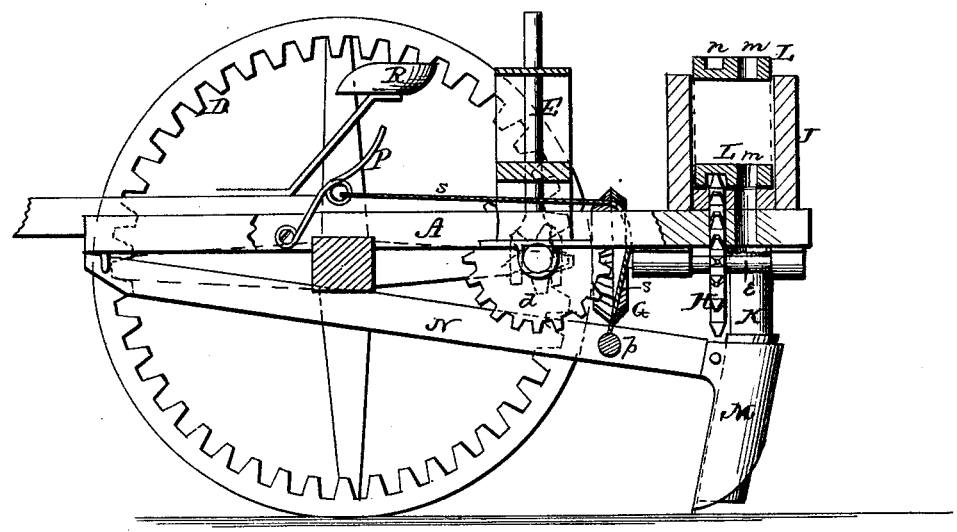
WITNESSES
Franck L. Durand
C. L. Evert
INVENTOR
D. R. Groves
By T. H. Alexander
Attorney

UNITED STATES PATENT OFFICE.

DAVID R. GROVES, OF CHEVIOT, OHIO.

IMPROVEMENT IN CORN-DRILLS.

Specification forming part of Letters Patent No. 180,870, dated August 8, 1876; application filed June 2, 1876.

*To all whom it may concern:*

Be it known that I, DAVID R. GROVES, of Cheviot, in the county of Hamilton and State of Ohio, have invented certain new and useful Improvements in Corn-Drills; and I do hereby declare that the following is a full, clear, and exact description thereof, reference being had to the accompanying drawings, and to the letters of reference marked thereon, which form part of this specification.

The nature of my invention consists in the construction and arrangement of a corn-drill, as will be hereinafter more fully set forth.

In the annexed drawing, Figure 1 is a plan view of my invention. Fig. 2 is a longitudinal section of the same.

A represents the frame of my machine, secured to the axle B, which has the driving-wheels C and D placed upon its ends. The wheel C is an ordinary driving-wheel, while the wheel D is an internal cog-wheel, acting also as a driving-wheel. This wheel D meshes with a pinion, $a$, upon a shaft, $b$, which runs parallel with the axle, and has a beveled pinion, $d$, on its inner end. The shaft $b$ may be moved laterally in its bearings by means of a lever, E, so as to throw the pinions $a$ and $d$ in and out of gear, the former with the internal cog-wheel D, and the latter with a bevel-wheel, G, and the front end of a shaft, E, placed in the rear part of the frame, and having a toothed wheel, H, secured on its rear end. On the rear part of the frame A are two seed-boxes I I, arranged in an elongated frame, J, at each end of which is a roller, $f$, having its journal-bearings in said frame J. Around these rollers is passed an endless chain, composed of a series of plates, L L, each of which has a tongue, $h$, at one end fitting in a corresponding notch in the end of the adjoining plate, and pivoted thereto. Each plate L has a dropping-hole, $m$, and two recesses, $n\ n$, made in the outer face, into which latter the teeth of the wheel H take to propel the chain. The chain passes through the seed-boxes I I, immediately over the bottoms thereof, and carries the desired amount of corn in the holes $m$ out from the boxes, and drops the same, through conductors K K, into the ground.

The front and rear sides of the boxes I are made inclined toward the center at the bottom, so as to conduct the corn toward the dropping-holes $m$ in the plates of the chain.

The conductors K are made of flexible material, and around each conductor is a tubular metal shank, M, which may form the shovel, or to which the shovel may be attached. Each shovel-shank M is attached to a beam, N, which is hung at its front end to the front end of the frame A, and the two beams are, near their rear ends, connected by a cross-bar or round, $p$, from which a cord, $s$, extends upward through a hole in one of the bars of the frame, and forward to a foot-lever, P.

The driver, seated on the seat R, can, by placing his foot on the foot-lever P, raise the shovels out of the ground whenever required.

In a full-sized machine there will, of course, be suitable coverers, as well as cut-offs or knockers.

This machine is adapted for corn and broom-corn.

Having thus fully described my invention, what I claim as new, and desire to secure by Letters Patent, is—

In a corn-drill, the endless chain, composed of a series of metallic plates, L L, each plate provided with the dropping-hole $m$, and recesses $n$, and each having a tongue, $h$, and corresponding notch at the opposite side, and pivoted together, substantially as herein set forth.

In testimony that I claim the foregoing as my own I affix my signature in presence of two witnesses.

DAVID R. GROVES.

Witnesses:
FRANK FRONDORF,
G. FRONDORF.